United States Patent
Gerber et al.

(10) Patent No.: US 9,524,260 B2
(45) Date of Patent: Dec. 20, 2016

(54) UNIVERSAL SERIAL BUS (USB) COMMUNICATION SYSTEMS AND METHODS

(71) Applicant: QUALCOMM Incorporated, San Diego, CA (US)

(72) Inventors: Nir Gerber, Haifa (IL); Daniel Hyongkyu Kim, San Diego, CA (US); Amir Borovietzky, Tel-Mond (IL); Dan Vardi, Haifa (IL); Andrey Michael Baranovsky, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 14/308,053

(22) Filed: Jun. 18, 2014

(65) Prior Publication Data
US 2015/0370733 A1    Dec. 24, 2015

(51) Int. Cl.
| G06F 3/00 | (2006.01) |
| G06F 5/00 | (2006.01) |
| G06F 13/00 | (2006.01) |
| G06F 13/28 | (2006.01) |
| G06F 13/42 | (2006.01) |

(52) U.S. Cl.
CPC .......... *G06F 13/28* (2013.01); *G06F 13/4221* (2013.01); *G06F 13/4295* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 5,832,492 | A | * | 11/1998 | Wooten | G06F 13/102 |
| 6,311,294 | B1 | * | 10/2001 | Larky | G06F 13/24 |
| | | | | | 710/33 |
| 7,987,302 | B2 | | 7/2011 | Diepstraten et al. | |
| 8,200,858 | B1 | * | 6/2012 | Shor | H04L 12/40032 |
| | | | | | 710/2 |
| 8,521,930 | B1 | * | 8/2013 | Meyers | G06F 13/22 |
| | | | | | 710/107 |
| 8,560,753 | B1 | * | 10/2013 | Hobbs et al. | 710/306 |
| 2001/0033583 | A1 | * | 10/2001 | Rabenko et al. | 370/503 |

(Continued)

FOREIGN PATENT DOCUMENTS

EP    1102171 A2    5/2001

OTHER PUBLICATIONS

International Search Report and Written Opinion for PCT/US2015/036210, mailed Aug. 27, 2015, 10 pages.

*Primary Examiner* — Henry Tsai
*Assistant Examiner* — Christopher Bartels
(74) *Attorney, Agent, or Firm* — Withrow & Terranova, PLLC

(57) ABSTRACT

Universal serial bus (USB) communication systems and methods are disclosed. In particular, aspects of the present disclosure optimize polling and scheduling of bulk data transfers from bulk endpoints connected through a USB connection. By reducing the amount of polling, and by favoring endpoints that are known to have data to transfer, unnecessary signaling is avoided. Reduction in signaling allows more data to be transferred in a shorter amount of time. Reducing the time required for a data transfer may allow for low power modes to be used, which in turn further saves power.

24 Claims, 9 Drawing Sheets

(56) References Cited

U.S. PATENT DOCUMENTS

| | | |
|---|---|---|
| 2002/0078283 A1 | 6/2002 | Purcell et al. |
| 2004/0177197 A1* | 9/2004 | McLeod ............... G06F 13/426 710/300 |
| 2006/0125863 A1* | 6/2006 | Silverbrook et al. ........... 347/14 |
| 2006/0206636 A1* | 9/2006 | McLeod ............. G06F 13/4045 710/29 |
| 2007/0174533 A1 | 7/2007 | Tseng et al. |
| 2008/0140811 A1* | 6/2008 | Welch ................. H04L 12/4625 709/219 |
| 2008/0228962 A1 | 9/2008 | Ong |
| 2009/0096413 A1* | 4/2009 | Partovi et al. ................ 320/108 |
| 2010/0198999 A1 | 8/2010 | Nair et al. |

* cited by examiner

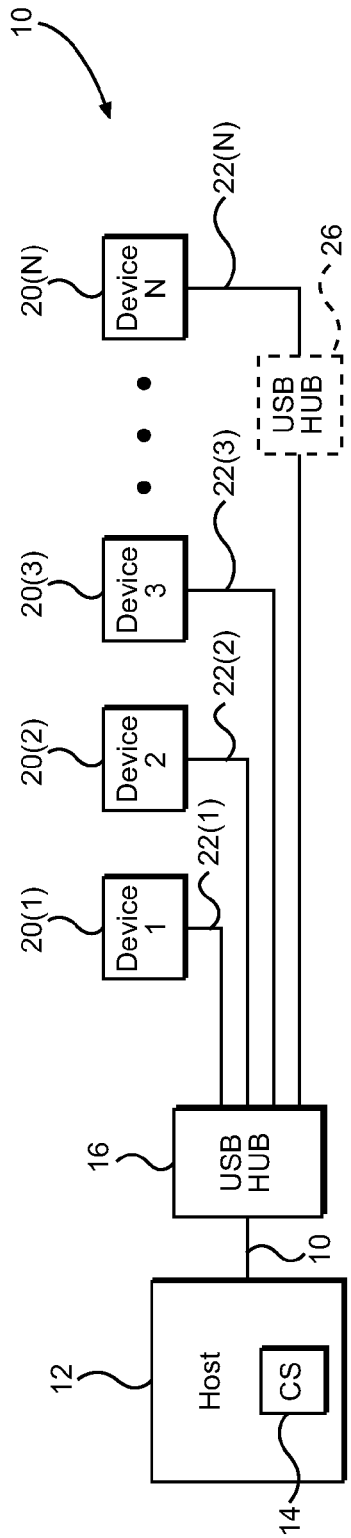
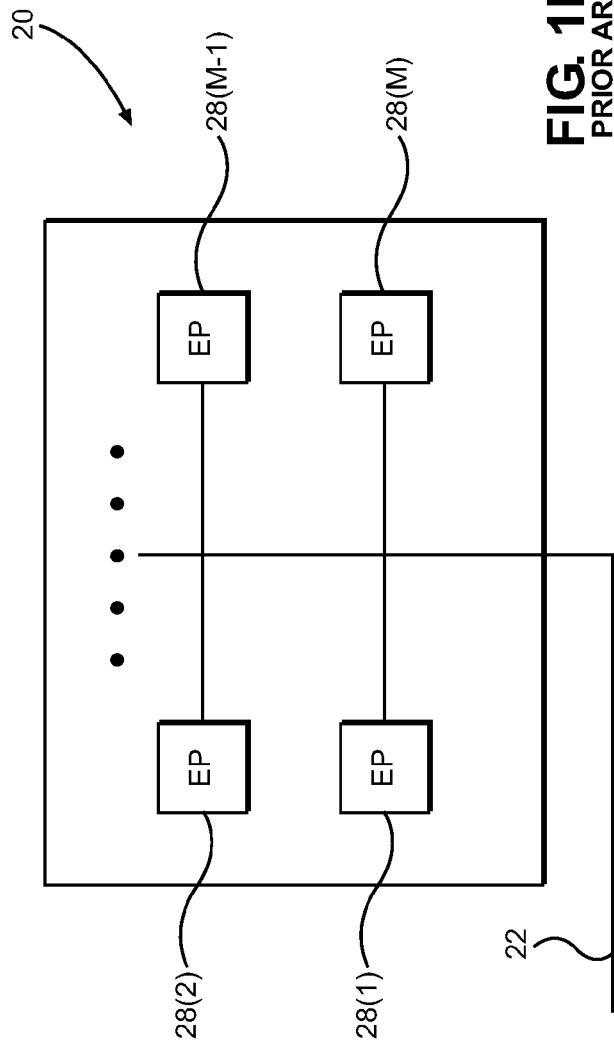
FIG. 1A PRIOR ART
FIG. 1B PRIOR ART

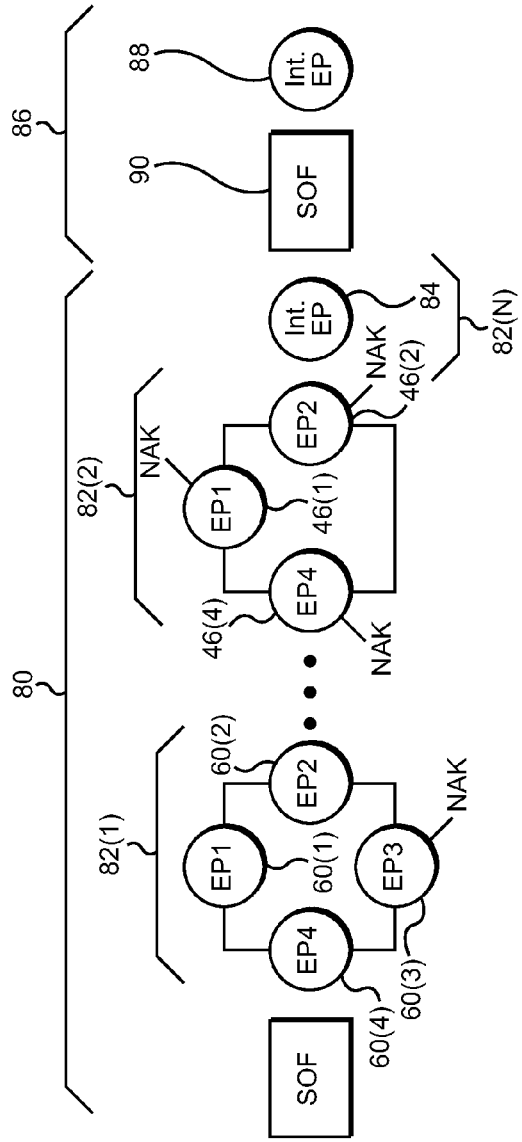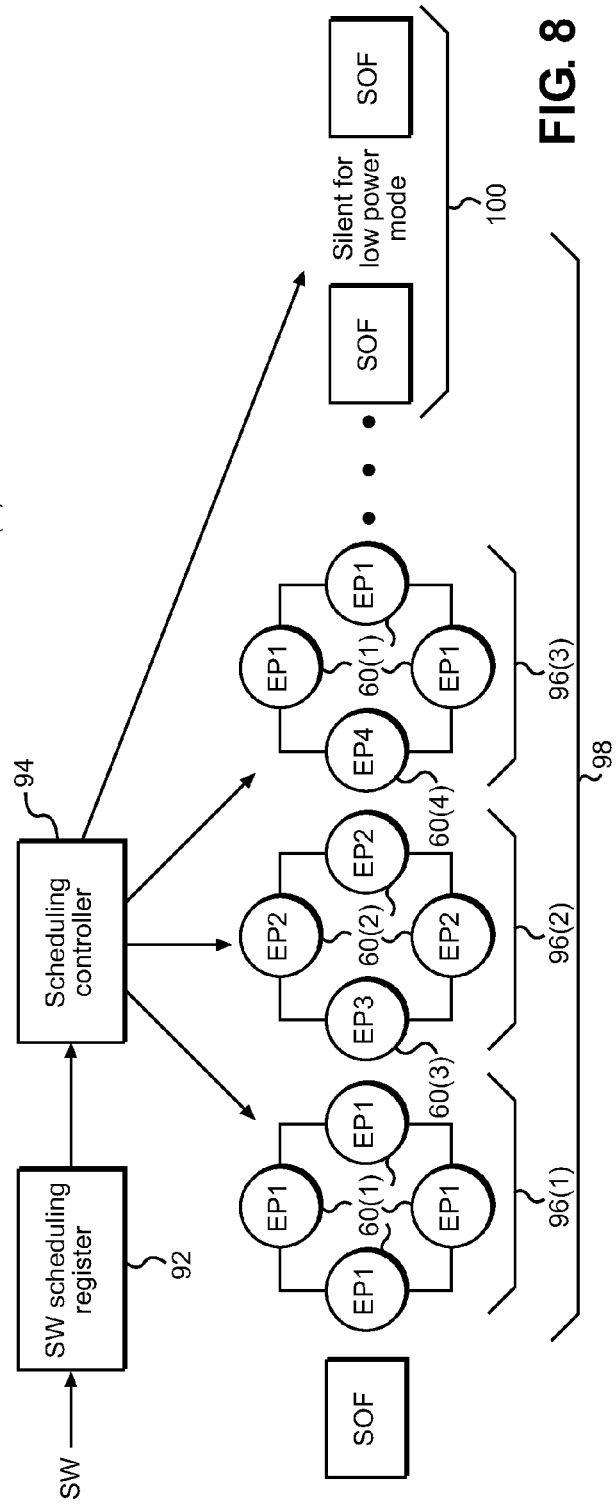

UNIVERSAL SERIAL BUS (USB) COMMUNICATION SYSTEMS AND METHODS

BACKGROUND

I. Field of the Disclosure

The technology of the disclosure relates generally to controlling communication between components coupled via a universal serial bus (USB) compliant connection.

II. Background

Computing devices are frequently built from multiple modules that communicate with one another over some form of data bus. Additionally, one or more peripheral components may be coupled to the computing device through a connector or cable that interoperates with such a data bus. For example, a desktop computer may be coupled to a removable FLASH memory stick by plugging the memory stick into a socket or to a phone by coupling the computer and phone with a cable. Many of the data buses used to interconnect modules or peripheral components may conform to a Universal Serial Bus (USB) protocol. While there are multiple versions of the USB protocol, the most common are USB 2.0 and USB 3.0.

Within the USB protocol, a single USB compliant connector may connect a host to a device having up to thirty-two (32) endpoints. The specification for the USB protocol allows for various types of endpoints, including isochronous, interrupt, control, and bulk. Bulk data transfers are typically bursty and contain a large amount of data that is not time sensitive (for example, a print job being sent to a printer). The specification of the USB protocol mandates fairness amongst the endpoints. This fairness is implemented by providing each endpoint a slot within a microframe. Further, in USB 2.0, fairness is achieved through a round robin format, with the host polling each endpoint of a device in turn. In the case of bulk endpoints, if no data is present, then the bulk endpoint returns a NAK signal. USB 3.0 provides an alternate process by which the endpoint may return a not ready (NRDY) signal, which is stored. Then, when data is available at the bulk endpoint, the device sends an endpoint ready signal (ERDY), and the host may reschedule the transaction.

In practice, several bulk endpoints may be polled that repeatedly return NAK signals. The round robin requirement dictates that those same endpoints will be polled again even if the host knows that a different endpoint has data to transfer (for example, because that endpoint had data to transfer the last time it was polled and not all the data fit within the allocated space in the microframe). Further, such constant polling precludes entry into a low power mode. Even in USB 3.0, throughput optimizations may be made based on which endpoints have data to transfer.

SUMMARY OF THE DISCLOSURE

Aspects disclosed in the detailed description include universal serial bus (USB) communication systems and methods. In particular, aspects of the present disclosure optimize polling and scheduling of bulk data transfers from bulk endpoints connected through a USB connection. By reducing the amount of polling, and by favoring endpoints that are known to have data to transfer, unnecessary signaling is avoided. Reductions in signaling allow more data to be transferred in a shorter amount of time. Reducing the time required for a data transfer may allow for low power modes to be used, which in turn further saves power.

In a first exemplary aspect, the optimization is done by not polling or skipping bulk endpoints once they have sent a negative indication (e.g., NAK, NYET, NRDY) signal. This skipping may last a predefined time period. In a second exemplary aspect, signals associated with interrupt transfers are scheduled when there are no bulk transfers to be done rather than waiting to do interrupt transfers at the beginning of a new frame. In each case, the optimization results in power savings through reduced signaling to inactive endpoints and consolidating signaling into a shorter time and fewer frames such that low power modes may be used.

In this regard, in one aspect, a method of controlling data transfer through a USB connection is disclosed. The method comprises receiving, at a control system associated with a host coupled to the USB connection, a negative indication from at least one of a plurality of bulk endpoints indicating that the at least one of the plurality of bulk endpoints does not have data ready to transfer. The method also comprises prioritizing bulk data transfers through the USB connection to other endpoints of the plurality of bulk endpoints based on the negative indication.

In another aspect, a computing device is disclosed. The computing device comprises a host configured to be coupled to a USB connection. The computing device also comprises a control system associated with the host and the USB connection. The control system is configured to receive a negative indication from at least one of a plurality of bulk endpoints indicating that the at least one of the plurality of bulk endpoints does not have data to transfer. The control system is also configured to prioritize bulk data transfers through the USB connection to other endpoints of the plurality of bulk endpoints based on the negative indication.

In another aspect, a method of controlling data transfer through a USB connection is disclosed. The method comprises determining that each of a plurality of bulk endpoints do not have data to transfer to a host. The method also comprises determining that a pending frame includes one or more interrupt transfers. The method also comprises sending an interrupt query to an interrupt endpoint before the pending frame begins.

In another aspect, a computing device is disclosed. The computing device comprises a host configured to be coupled to a USB connection. The computing device also comprises a control system associated with the host. The control system is configured to determine that each of a plurality of bulk endpoints do not have data to transfer to the host. The control system is also configured to determine that a pending frame includes one or more interrupt transfers. The control system is also configured to send an interrupt query to an interrupt endpoint through the USB connection before the pending frame begins.

BRIEF DESCRIPTION OF THE FIGURES

FIG. 1A is a simplified block diagram of a computing device having a host coupled to a plurality of devices, each with one or more endpoints, the host coupled to the plurality of devices through universal serial bus (USB) connections;

FIG. 1B is a simplified block diagram of one of the plurality of the devices of FIG. 1A with endpoints illustrated;

FIG. 7 is a simplified illustration of an exemplary aspect of an optimized interrupt process;

FIG. 8 is a simplified illustration of an optimized bulk transfer allowing a low power mode to be used;

DETAILED DESCRIPTION

Figure 2:
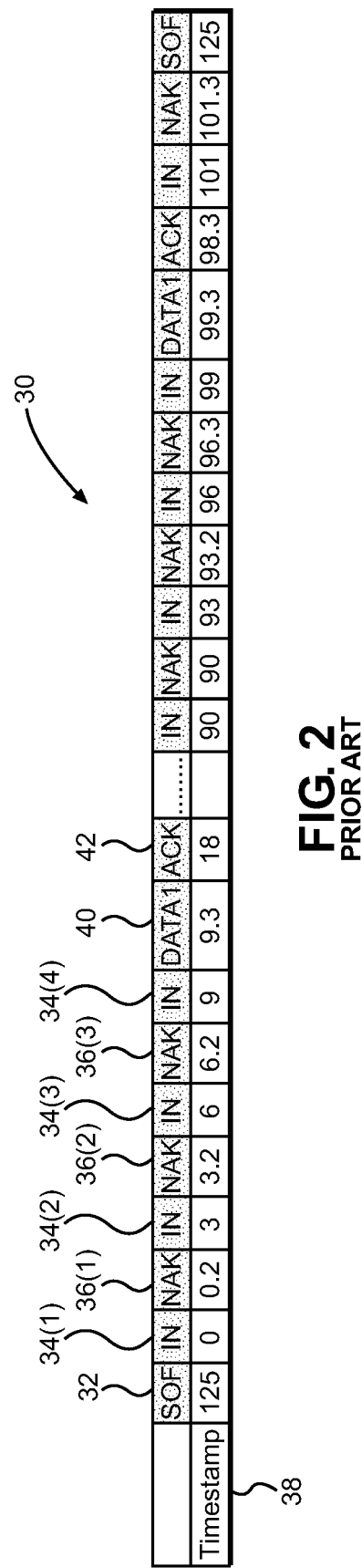
FIG. 2 is a simplified diagram of a frame with timestamp illustrating a query response of a conventional USB 2.0 round robin bulk transfer sequence.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include universal serial bus (USB) communication systems and methods. In particular, aspects of the present disclosure optimize polling and scheduling of bulk data transfers from bulk endpoints connected through a USB connection. By reducing the amount of polling, and by favoring endpoints that are known to have data to transfer, unnecessary signaling is avoided. Reductions in signaling allow more data to be transferred in a shorter amount of time. Reducing the time required for a data transfer may allow for low power modes to be used, which in turn further saves power.

In a first exemplary aspect, the optimization is done by not polling or skipping bulk endpoints once they have sent a negative indication (e.g., NAK, NYET, NRDY) signal. This skipping may last a predefined time period. In a second exemplary aspect, signals associated with interrupt transfers are scheduled when there are no bulk transfers to be done rather than at the beginning of a frame. In each case, the optimization results in power savings through reduced signaling to inactive endpoints and consolidating signaling into a shorter time and fewer frames such that low power modes may be used.

Before addressing exemplary aspects of the present disclosure, a brief overview of a conventional host coupled to a plurality of devices through USB connections is discussed with reference to FIGS. 1A-3. Exemplary aspects of the present disclosure begin below with reference to FIG. 4.

In this regard, FIG. 1A is a simplified block diagram of a computing device 10 having a host 12. The host 12 may have a control system (CS) 14 that may include hardware and/or software that provides the conventional functionality of a USB host. The host 12 may be coupled to a USB hub 16 through a USB connection 18. The USB connection 18 may be a connector, a connector and cable, or a fixed connection as is well understood and may operate according to USB 2.0, USB 3.0, or USB 3.1 standards. The USB hub 16 may be coupled to one or more devices 20(1)-20(N) (generically device 20) through respective USB connections 22(1)-22(N) (generically connection 22). The USB connections 22(1)-22(N) may be connectors, connectors with cables, or fixed connection as is well understood and may operate according to USB 2.0, USB 3.0, or USB 3.1 standards. Further, one or more of the USB connections 22 may have an intervening additional USB hub 26. For example, as illustrated, USB connection 22(N) has intervening additional USB hub 26. Note that USB hub 16 and intervening additional USB hub 26 are both optional.

By way of example, the host 12 is a desktop computer coupled to a USB hub 16, such as the BELKIN® USB 2.0 4-PORT ULTRA-MINI HUB or the ANKER® AH231 USB HUB with 9 USB 3.0 DATA PORTS+1 SMART CHARGING PORT and the devices 20(1)-20(N) are peripheral devices such as USB memory sticks, printers, speakers, mouse, keyboard, or the like. The intervening additional hub 26 may be used to extend short cables or provide additional ports as is well understood.

A device 20 is better illustrated with reference to FIG. 1B. In particular, the device 20 of FIG. 1B may include one or more endpoints (EP) 28(1)-28(M). The USB standard allows for up to thirty-two EP within a device. Thus, M may be between one and thirty-two. The EP 28(1)-28(M) may be any of the various types of endpoints, including isochronous, interrupt, control, and bulk. Likewise the EP 28(1)-28(M) may be IN or OUT EP as is well understood.

Referring to both FIGS. 1A and 1B, the CS 14 uses a host controller interface (HCI) standard to query the EP 28 of the devices 20(1)-20(N). For example, in a USB 2.0 compliant system, the HCI may comply with Enhanced HCI (eHCI) standard and in a USB 3.0 or 3.1 compliant system, the HCI may comply with eXtensible (xHCI) standard. Under such HCI standards, there may be four types of data transfers: control, interrupt, bulk, and isochronous. Thus, the EP 28 may be control endpoints, interrupt endpoints, bulk endpoints, or isochronous endpoints. Of interest are bulk data transfers, which are typically large, bursty, time-insensitive blocks of data such as, for example, a print job being sent to a printer or a file being sent to storage.

With continued reference to FIGS. 1A and 1B, to ensure fairness, the CS 14 queries the bulk endpoints among the EP 28 of the devices 20(1)-20(N) in a round robin format. However, such round robin queries are not efficient, particularly for bulk endpoints. In particular, if the bulk endpoint does not have data to transfer to the host 12, the bulk endpoint sends back a negative indication to the host 12. In USB 2.0, the negative indication is a NAK signal. In USB 3.0 and 3.1, the negative indication is a NRDY (not ready) or NYET signal. Each time the query and negative indication are sent, time is lost that could have been used for data transfer from other bulk endpoints that have data.

In this regard, FIG. 2 illustrates a hypothetical frame 30 sent by the host 12 of FIG. 1A. For the sake of example, it is assumed that all the EP 28(1)-28(M) of each device 20(1)-20(N) are bulk endpoints and are referred to as bulk EP 28 hereafter. The start of frame (SOF) 32 begins the frame 30. The host sends a query in the form of an IN token at 34(1) to a first bulk EP 28(1). The first bulk EP 28(1) sends a NAK signal 36(1). As evidenced by the values in timestamp 38, this may take 0.2 microseconds. Additional IN tokens are sent to other bulk EP 28(2)-28(M) at 34(2), 34(3) and additional NAK signals 36(2), 36(3) are received.

Sending additional IN tokens consumes 6.2 microseconds as indicted in the timestamp 38. Finally, the IN token at 34(4) to a fourth bulk EP 28(4) results in data 40 being sent to the host 12 and a subsequent ACK signal 42 is sent. This process continues throughout the frame 30 with IN tokens being sent to the bulk EP 28, and negative indications being received by the host 12. For a given frame 30, given the bursty nature of bulk transfers, if a given one of the bulk EP 28 indicates no data through a NAK signal once, it is likely that that bulk EP 28 will continue to return NAK signals for the rest of the frame 30. Likewise, if a bulk EP 28 returns data after receiving an IN token, given the large data files associated with bulk transfers, the bulk EP 28 is not likely able to send all of its data in a single slot within the frame 30.

Figure 3:
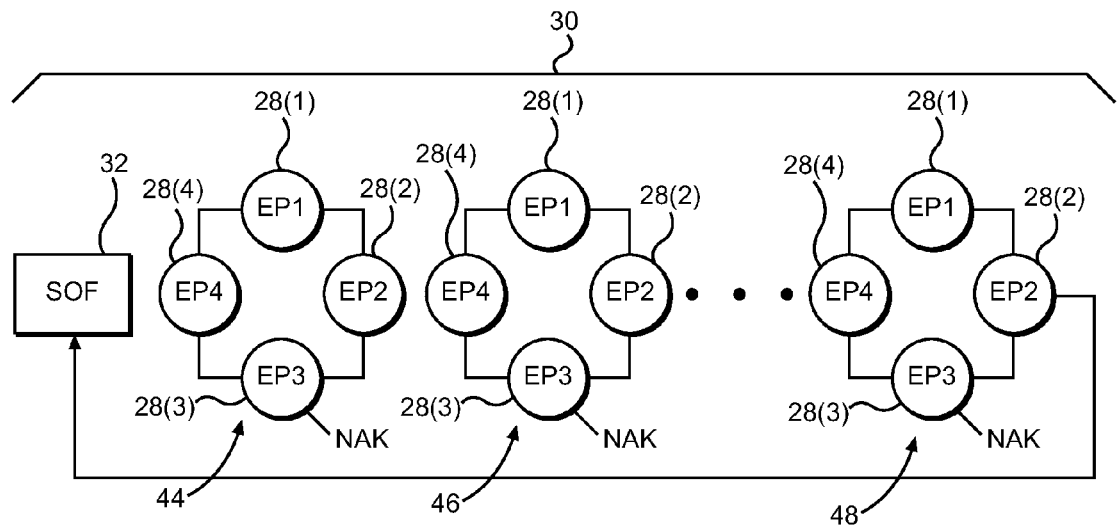
FIG. 3 is a simplified illustration of a conventional round robin query through a USB 2.0 bus to a device with four bulk IN endpoints.

A simplified illustration of the ramifications of the round robin requirement is illustrated in FIG. 3 that assumes there are four bulk endpoints EP 28(1)-28(4) that are to be queried. These EP 28(1)-28(4) may be in a single device 20 or spread across multiple devices 20. For the purposes of FIG. 3, bulk EP 28(1), 28(2), and 28(4) all have data to transfer to the host 12. Bulk EP 28(3) has no data to transfer. In sub-frame 44 of frame 30, the host 12 sends IN tokens to each endpoint in turn and receives data from EP 28(1) and EP 28(2), but receives a NAK signal from EP 28(3), and then data from EP 28(4). In sub-frame 46, the same results occur and so on throughout the frame 30 to sub-frame 48 and the end of the frame 30.

As is readily appreciated, each query and negative indication consumes power. Likewise, the constant queries for each EP 28 mean that data transfers frequently last more than one frame 30, which means that the host 12 remains active through multiple frames 30. Such activity precludes entry into a low power state. The excess messaging and the lack of low power states both contribute to power consumption. While power consumption may not be of concern in a desktop computing device, mobile terminals such as smart phones, tablets, and laptops have pressure to decrease power consumption to extend the time available between rechargings.

Exemplary aspects of the present disclosure reduce power consumption by optimizing bulk data transfers. In particular, instead of the round robin format of the xHCI and eHCI, in exemplary aspects of the present disclosure, priority is given to bulk endpoints that are known to have data, and endpoints that send negative indications are skipped in subsequent sub-frames. The skipping may be done until the end of a frame or for a predefined time after a negative indication (for example, a few milliseconds).

Figure 4:
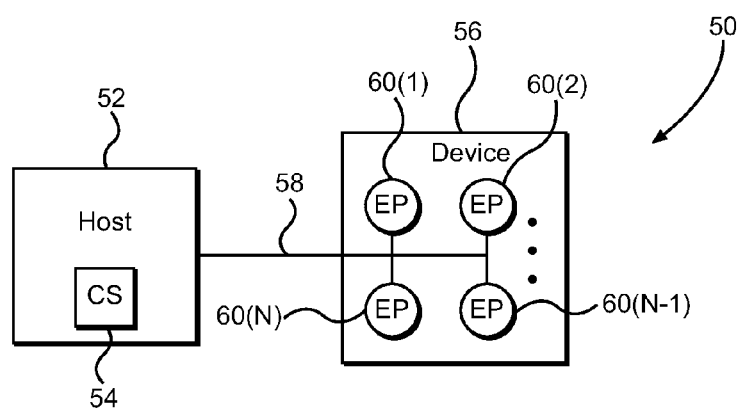
FIG. 4 is a simplified block diagram of a computing device having a host coupled to a plurality of devices, each device with one or more endpoints with the host coupled to the devices through USB connections according to an exemplary aspect of the present disclosure.

In this regard, FIG. 4 illustrates a computing device 50 having a host 52 with a CS 54. The host 52 is coupled to a device 56 through a USB connection 58. The device 56 may include a plurality of EP 60(1)-60(N) (generically referred to as EP(s) 60. The CS 54 may include hardware and/or software that implements exemplary aspects of the present disclosure. The USB connection 58 may operate according to USB 2.0, USB 3.0, or USB 3.1 standards as modified by the aspects disclosed herein.

Figure 5:
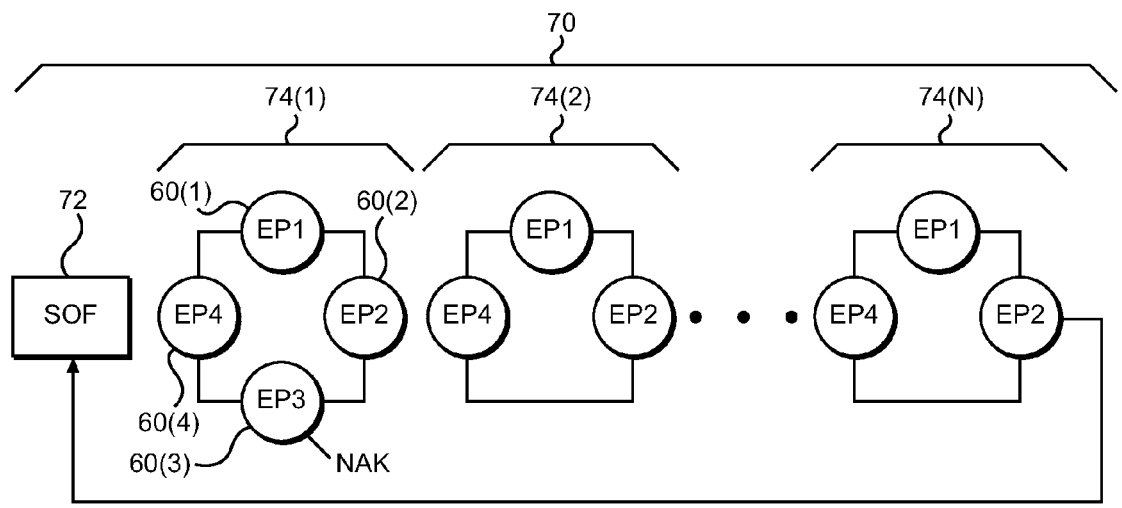
FIG. 5 is a simplified illustration of an exemplary aspect of an optimized bulk transfer process.

As noted above, in an exemplary aspect, the control system 54 may optimize data transfers by skipping bulk endpoints that do not have data. This skipping is illustrated in FIG. 5. In particular a frame 70 is illustrated having a start of frame (SOF) 72. Frame 70 further has sub-frames 74(1)-74(N). In the first sub-frame 74(1), a query is sent to each of the EP 60(1)-60(4) of computing device 50 (FIG. 4). The query may be an IN token as previously discussed. The first EP 60(1) returns data as does the second EP60(2). However, the third EP 60(3) returns a NAK signal. The fourth EP 60(4) returns data. Thus, in subsequent sub-frames 74(2)-74(N) the third EP 60(3) is skipped. By skipping the third EP 60(3), the host 52 does not use power and time sending an IN token that will likely generate a NAK signal. In a subsequent frame, the host 52 may query the third EP 60(3) again. However, the delay between such queries to the third EP 60(3) is acceptable given the generally time-insensitive nature of bulk data transfers. Instead of delaying the subsequent query to a subsequent frame, the host 52 may delay such subsequent query by a predefined time.

Figure 6:
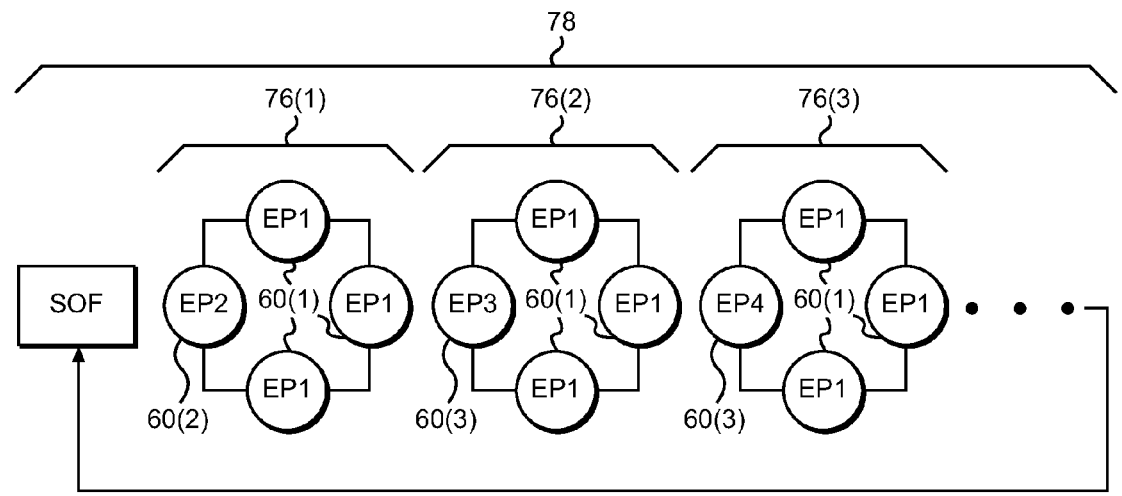
FIG. 6 is a simplified illustration of an exemplary aspect of a weighted bulk transfer process.

Instead of, or in addition to the optimization achieved through the skipping described with reference to FIG. 5, further optimization may be done by weighting a particular endpoint. In this regard, FIG. 6 illustrates weighting the first EP 60(1) and continuing to query the remaining EP 60(2), 60(3), 60(4) in sequential sub-frames. Thus, in the example provided, each sub-frame 76(1)-76(3) within frame 78 gives three slots to first EP 60(1). The sub-frames 76(1)-76(3) each give a slot to one of the other EP 60(2)-60(4) (i.e., first sub-frame 76(1) also queries second EP 60(2), second sub-frame 76(2) queries third EP 60(3), and so on). This modified fairness may be used to prioritize particularly large data transfers from the favored endpoint or provide a timely bulk data transfer in the unlikely event that the bulk data transfer is actually time sensitive. The weighted round robin may also be based on the historical ACK/NAK responses of a given EP 60, all the EP 60(1)-60(N) of a device 56, or other criteria as needed or desired.

Instead of, or in addition to, prioritizing bulk data transfers, exemplary aspects of the present disclosure may also be applied to interrupt transfers. Normally, in the USB protocol, if an EP 60 requires the attention of the host 52, the EP 60 must wait until the host 52 polls the EP 60. The host 52 periodically polls the interrupt EP 60 (i.e., the EP 60 that are designated as interrupt endpoints). The rate of polling is set by endpoint descriptor, but typically occurs at the beginning of a frame. However, there are frequently times when there are no bulk transfers to be made that could advantageously be used to poll the interrupt endpoints.

In this regard, FIG. 7 illustrates a simplified frame 80 with sub-frames 82(1)-82(N). In a first sub-frame 82(1), EP 60(1)-60(4) are bulk EP, and only one EP 60(3) returns a NAK. In a subsequent sub-frame 82(2), the remaining EP 60(1), 60(2), and 60(4) return NAKs. As noted above, EP 60(3) is already skipped because of its previous NAK signal. Under exemplary aspects of the present disclosure, once, all the bulk EP 60 have returned NAK signals, each EP 60 is skipped until the end of the frame 80. If, as illustrated, this skipping of all bulk EP 60 occurs before a final sub-frame 82(N) within the frame 80, the sub-frames 82 that remain may be used to send an interrupt query 84 to the interrupt EP 60. The subsequent frame 86 may eliminate or skip its normally scheduled interrupt query 88 after start of frame 90.

Instead of, or in addition to moving the interrupt queries around as described above with reference to FIG. 7, it is possible to optimize the scheduling of bulk transfers sufficiently that the host may enter a low power or sleep mode. Entry into such a low power or sleep mode saves power and extends battery life for mobile terminals. In this regard, with reference to FIG. 8 software associated with the control system 54 may include a software scheduling register 92 that communicates with a scheduling controller 94 that may prioritize different ratios of bulk transfers to optimize bulk data transfers. In particular, the scheduling controller 94 may be aware of the size of pending bulk data transfers and evaluate how best to schedule the transfers so as to get all the transfers done in the shortest amount of time. For example, if one bulk transfer is particularly large, all the slots in a sub-frame 96(1) of a frame 98 may be devoted to that data transfer. Then a subsequent sub-frame 96(2) may be devoted to the next largest bulk data transfer with one (or a few) slots devoted to other data transfers. As the majority of the data from the larger transfers have been transferred, a more even balance data transfer may be scheduled for later sub-frames (e.g., sub-frame 96(3)). Such scheduling allows more data to be put into a given frame 98 relative to the round robin format of the conventional HCI of the USB standards. Accordingly, it is possible that entire frames may be free of data transfer. The scheduling controller 94 may recognize that no data is scheduled for a particular frame and enter a low power or sleep mode for such unoccupied frames 100. Note that this aspect is also applicable to USB 3.0 and 3.1.

While the above Figures present simplified versions of what may happen within a frame or sub-frame, the discussion has been focused on data transfers to the host 52. The present disclosure is not so limited. Similar optimization may be made for data transfers from the host to a particular endpoint.

Figure 9:
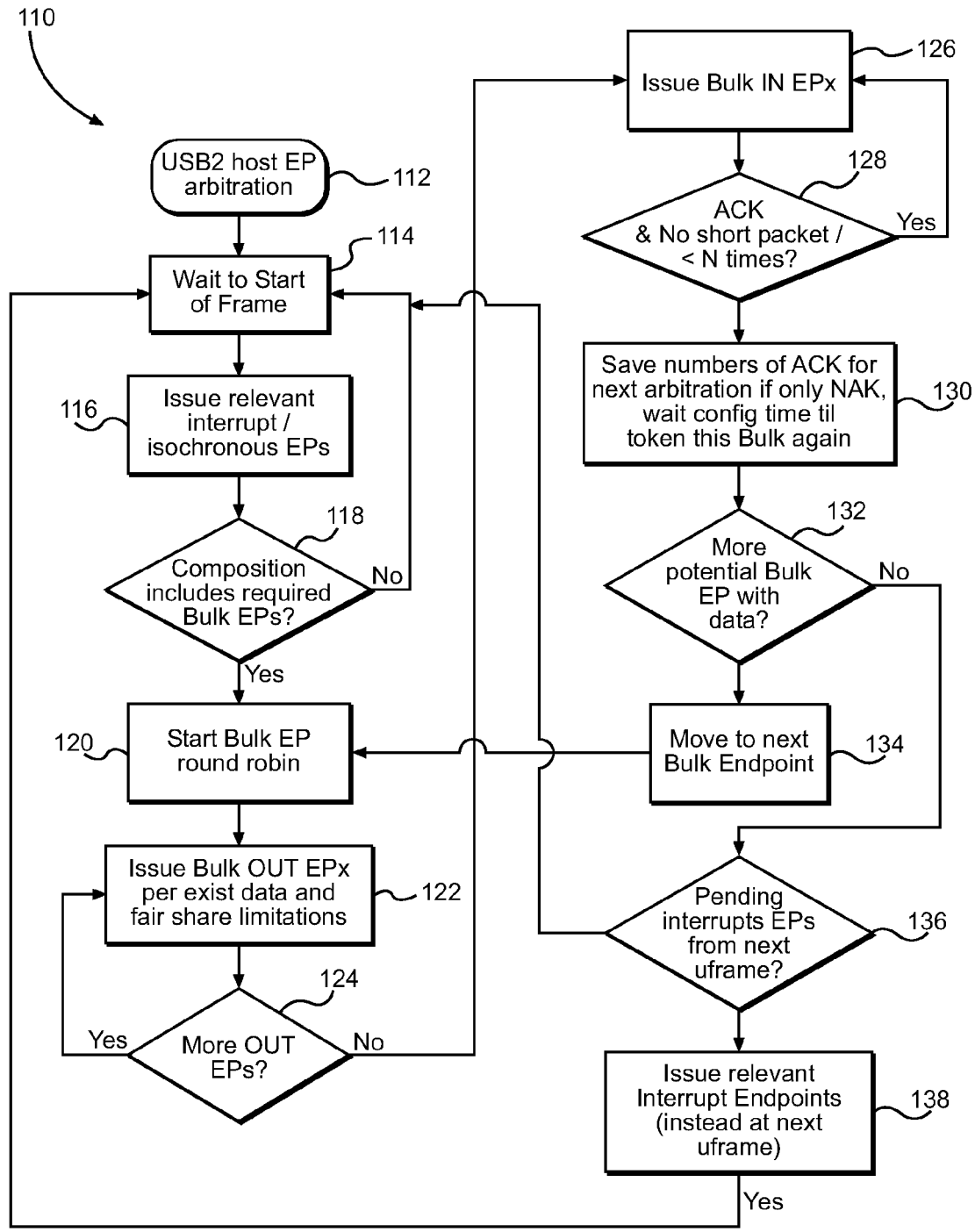
FIG. 9 is a flow chart showing an exemplary endpoint arbitration process for USB 2.0 according to an exemplary aspect of the present disclosure.

In this regard, FIG. 9 illustrates a variety of optimization techniques in a single flow chart of a process 110 that is applicable to USB 2.0. The process 110 starts when the host 52 starts EP arbitration (block 112). The CS 54 waits to the start of the frame (block 114). After the start of a frame (e.g., frame 80), the CS 54 causes the host 52 to issue IN tokens to any relevant interrupt or isochronous EP 60 (block 116). The CS 54 evaluates whether an EP composition includes any required bulk EPs 60 (block 118). The EP composition is a list of active EPs 60 of the host 52 per application and the relevant connected devices. As such, the EP composition is dependent on the device and host drivers. If the answer to block 118 is no, then the process 110 returns to block 114. If, however, the answer to block 118 is yes, then the CS 54 starts the bulk EP round robin queries (block 120).

With continued reference to FIG. 9, the CS 54 may issue OUT tokens to bulk EPs 60 to which the host 52 is sending data per existing data and fair share limitations (block 122). The CS 54 evaluates if there are more OUT EP 60 (block 124). If the answer to block 124 is yes, more OUT tokens are issued at block 122. If the answer to block 124 is no, the process 110 continues with the CS 54 issuing bulk IN tokens to the bulk EP 60 (block 126). The CS 54 determines if there was an ACK and no short packet (i.e., a packet that is less than 512 bytes in USB 2.0 or less than 1024 bytes in USB 3.0, and typically means that a transfer is done, which implies that the probability for data in the next transfer is lower; if there is not a short packet, there is a high probability that there is more data at this IN EP 60) (block 128). If the answer was yes, there was an ACK, the process repeats for the next bulk EP 60 by returning to block 126. Block 128 is repeated for each of the N bulk EPs 60(1)-60(N) and then the process 110 continues. The CS 54 saves the number of ACK for the next arbitration or frame. If only NAK were returned, then the CS 54 configures a wait time before issuing bulk IN tokens for this EP 60 again (block 130). The CS 54 checks if there are more potential bulk EP 60 with data (block 132). If the answer is yes, the process 110 moves to the next bulk EP 60 (block 134) and then the process 110 returns to block 120 with the bulk round robin.

With continued reference to FIG. 9, if the answer to block 132 is no, there are no potential bulk EPs 60, the CS 54 evaluates if there are pending interrupt EPs 60 from a pending frame (block 136). If the answer to block 136 is yes, then the CS 54 issues IN tokens to the relevant interrupt EP (instead of at the next frame) (block 138). The process then returns to block 114. If the answer to block 136 is no, the process returns to block 114 without issuing such preemptive IN tokens.

The process 110 allows for adaptive learning of EP responses and allows scheduling of bulk EP transfers to optimize the tokens and reduce the likelihood that time and power will be used sending a query and receiving a negative indication. Further, the process allows transfers with bulk EP 60 based on throughput requirements and based on previous responses. Thus, if no transfer is needed, the computing device 50 may enter a lower power mode for a configurable time. Likewise, priority may be given to EPs 60 that have data to transfer and allocated more slots within a frame. As a further optimization aspect, if a bulk OUT EP 60 is transferring data, the CS 54 may prioritize that data transfer until the transfer is complete for better efficiency. That is, usually changing between EP 60 consumes extra time. When data is available at a specific EP 60, it is generally more efficient to stay with that EP 60 and continue to do bulk OUT EP 60 or bulk IN EP 60 until there is no data in OUT, or per a prediction that there will not be data in IN EP 60.

While the process 110 is appropriate for USB 2.0, USB 3.0 has a different IN token and response process. Accordingly, exemplary aspects of the present disclosure may be modified to operate with USB 3.0 and 3.1. An exemplary aspect of such process 140 is provided with reference to FIG. 10. The process 140 starts with the USB host 52 starting EP arbitration (block 142). The CS 54 waits to the start of the frame (block 144). After the start of a frame (e.g., frame 80), the CS 54 causes the host 52 to issue IN tokens to any relevant interrupt or isochronous EP 60 (block 146). The CS 54 evaluates whether a composition includes any required bulk EPs 60 (block 148). If the answer to block 148 is no, then the process 140 returns to block 144. If, however, the answer to block 148 is yes, then the CS 54 starts the bulk EP round robin queries (block 150).

Figure 10:
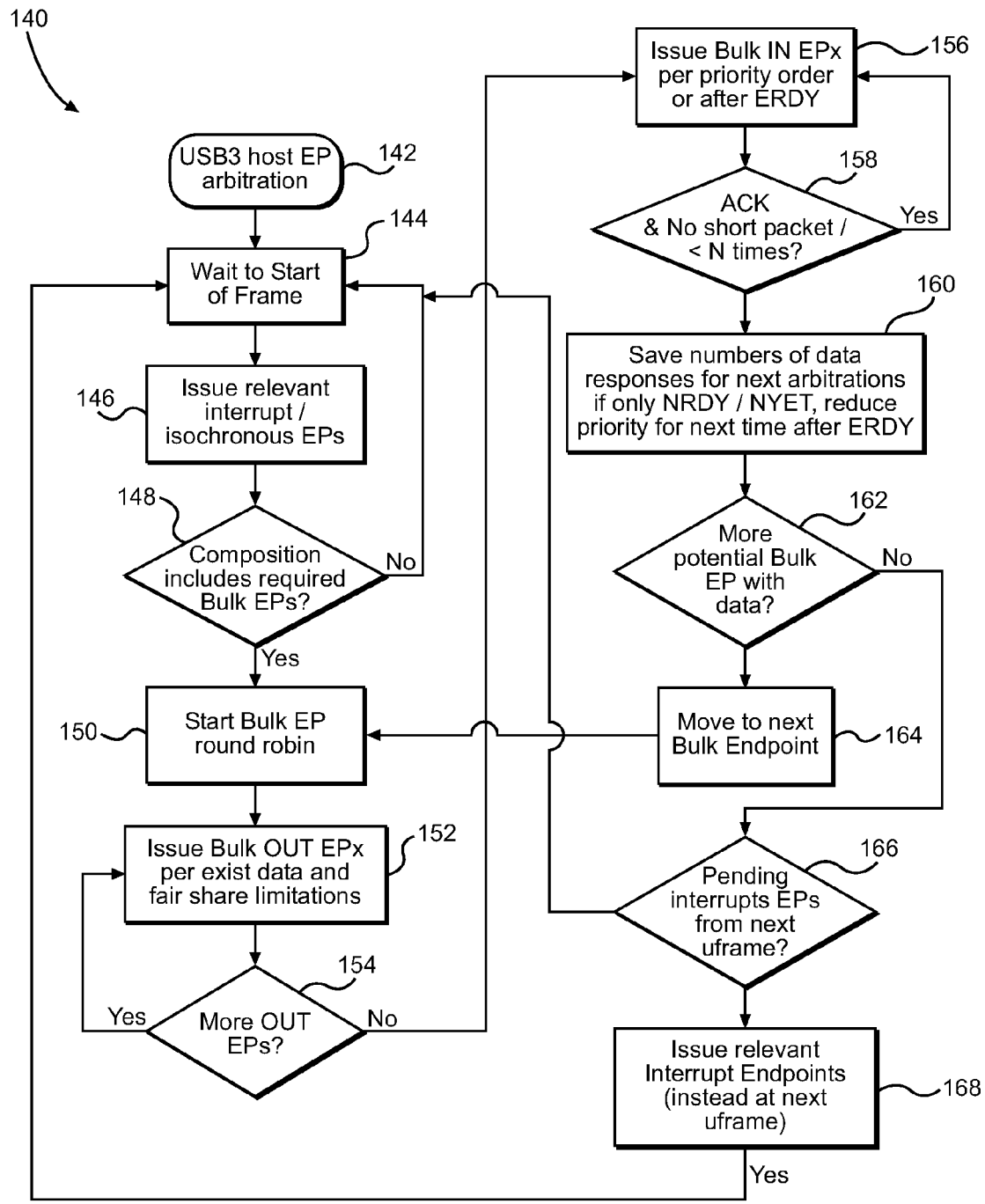
FIG. 10 is a flow chart showing an exemplary endpoint arbitration process for USB 3.0 according to an exemplary aspect of the present disclosure.

With continued reference to FIG. 10, the CS 54 may issue OUT tokens to bulk EPs 60 to which the host 52 is sending data per existing data and fair share limitations (block 152). The CS 54 evaluates if there are more OUT EP 60 (block 154). If the answer to block 154 is yes, more OUT tokens are issued at block 152. If the answer to block 154 is no, the process 140 continues with the CS 54 issuing bulk IN tokens to the bulk EP 60 or after receiving an ERDY signal from an EP 60 (block 156). The CS 54 determines if there was data and no short packet (block 158). If the answer was yes, there was data, the process repeats for the next bulk EP 60 by returning to block 156. Block 158 is repeated for each of the N bulk EPs and then the process 140 continues. The CS 54 saves the number of data responses for the next arbitration or frame. If only negative indications (NRDY or NYET) were returned, then the CS 54 reduces priority for that EP for the next time an ERDY is received (block 160). The CS 54 checks if there are more potential bulk EP 60 with data (block 162). If the answer is yes, the process 140 moves to the next bulk EP 60 (block 164) and then the process 140 returns to block 150 with the bulk round robin.

With continued reference to FIG. 10, if the answer to block 152 is no, there are no potential bulk EP 60, the CS 54 evaluates if there are pending interrupt EP 60 from a pending frame (block 166). If the answer to block 166 is yes, then the CS 45 issues IN tokens to the relevant interrupt EP 60 (instead of at the next frame) (block 168). The process then returns to block 144. If the answer to block 166 is no, the process returns to block 134 without issuing such preemptive IN tokens.

Figure 11:
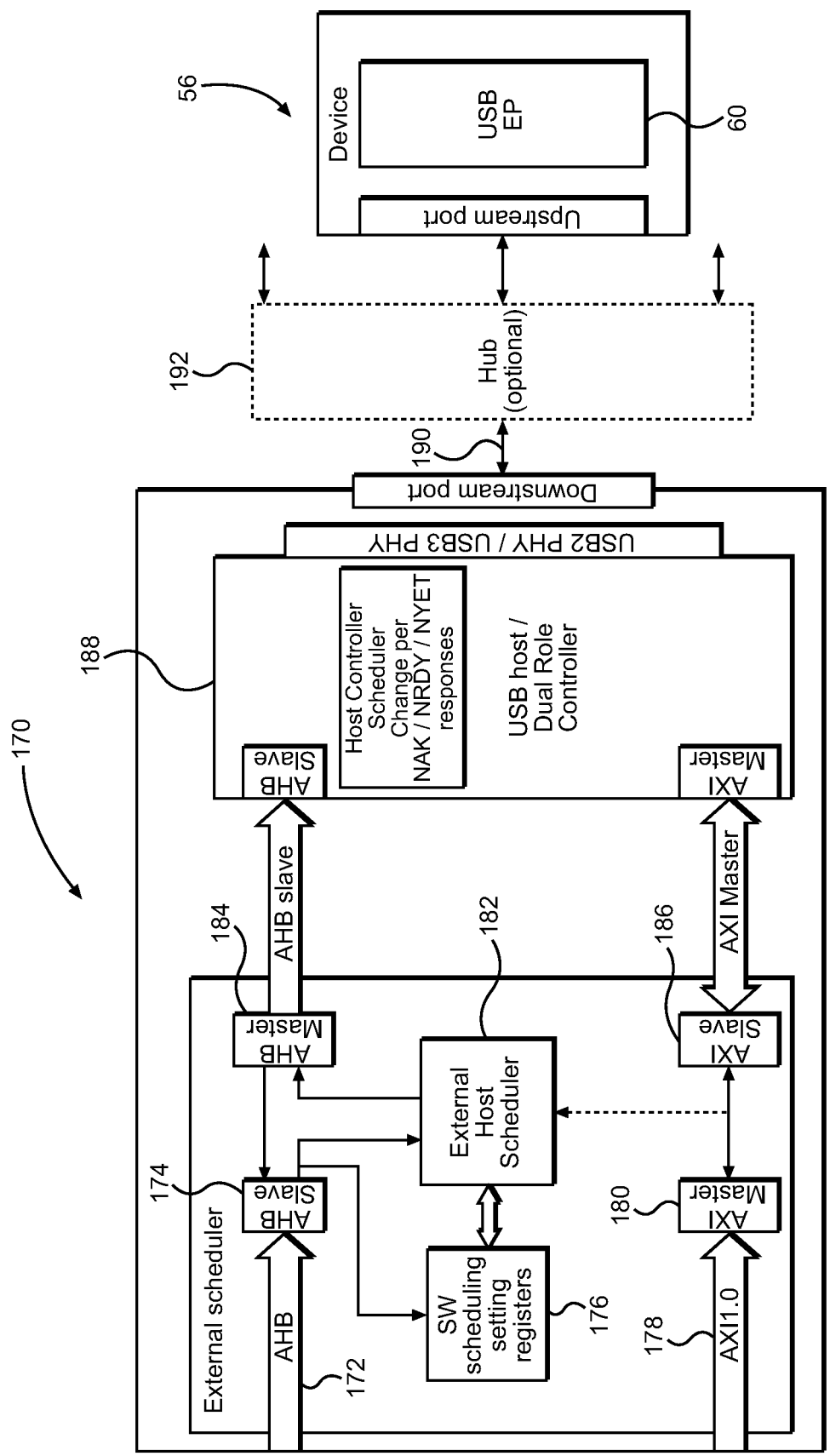
FIG. 11 is a block diagram of an external scheduler that may be used to optimize data transfer through the USB connectors.

While the above discussion contemplates that the CS 54 is internal to the host 52, the present disclosure is not so limited. An external controller or external scheduler may also be used. In this regard, FIG. 11 illustrates an external scheduler 170 be coupled to the host 52 through an advanced high-performance bus (AHB) 172 as a slave using an AHB slave module 174. Configuration data is passed to the software scheduling and setting registers 176. The external scheduler 170 may further be coupled to an advanced extensible interface (AXI) 178 at an AXI master module 180. The external host scheduler module 182 receives data as noted and sends data through an AHB master module 184 and an AXI slave module 186 with a USB host/dual role controller 188 so as to communicate with devices 56 through USB connection 58. An optional hub 116 may be positioned between the external scheduler 170 and the device 56. Thus, as illustrated, the responses are analyzed based on the AXI write to system memory. If the external scheduler 170 identifies that there was no data from a specific EP 60 by virtue of a NAK, the external scheduler 170 may instruct the controller to stop querying that specific EP 60.

The systems and methods for improved performance over USB and related components according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 12:
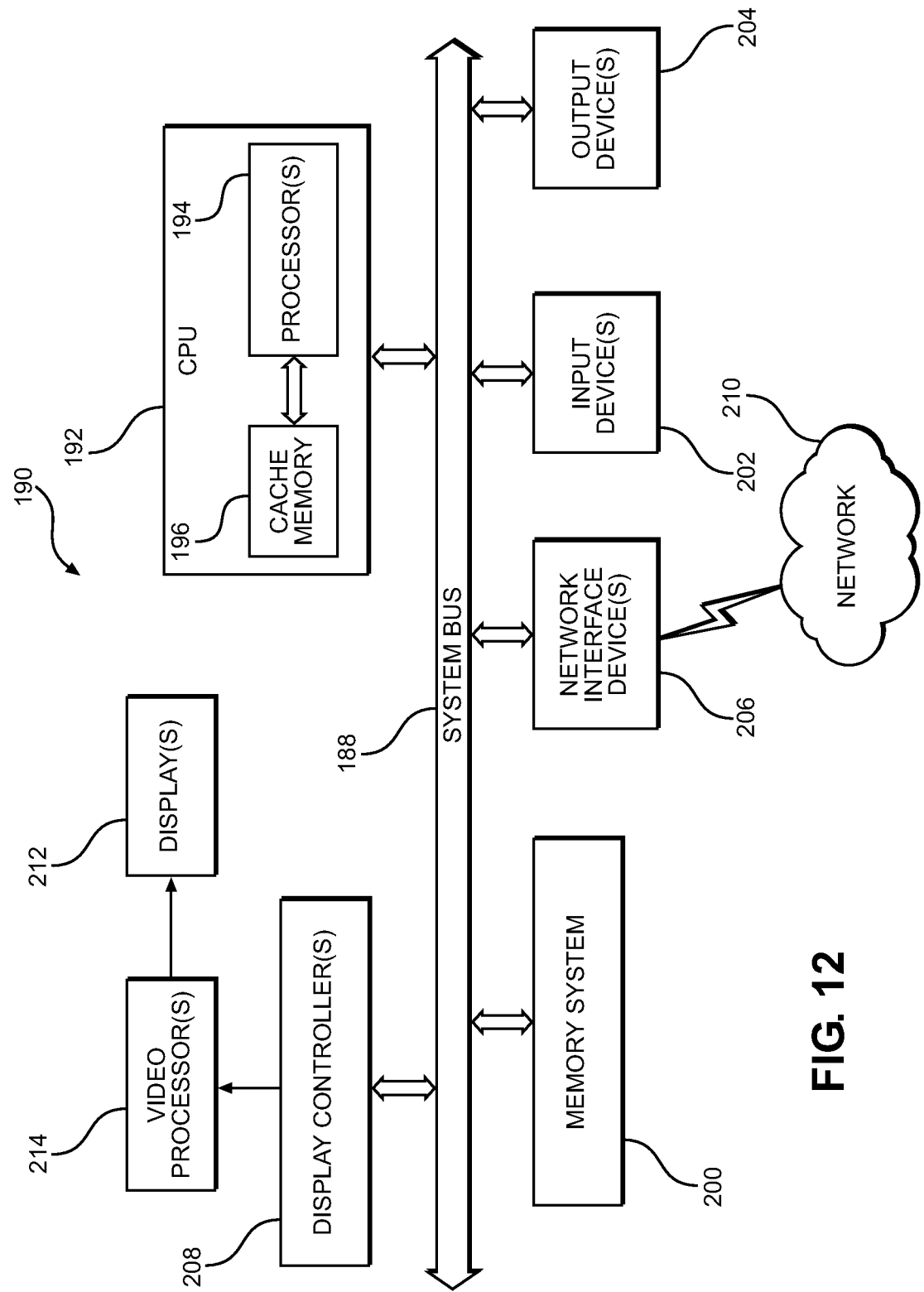
FIG. 12 is a block diagram of an exemplary processor-based system that can include optimized USB connectors according to exemplary aspects of the present disclosure.

In this regard, FIG. 12 illustrates an example of a processor-based system 190 that can employ the methods and hardware disclosed herein. In this example, the processor-based system 190 includes one or more central processing units (CPUs) 192, each including one or more processors 194. The CPU(s) 192 may have cache memory 196 coupled to the processor(s) 194 for rapid access to temporarily stored data. The CPU(s) 192 is coupled to a system bus 198 and can intercouple devices included in the processor-based system 190. The system bus 198 may be a USB compliant bus with host 52 and devices 56 as illustrated in FIG. 4. As is well known, the CPU(s) 192 communicates with these other devices by exchanging address, control, and data information over the system bus 198. For example, the CPU(s) 192 can communicate bus transaction requests to the memory system 200.

Other devices can be connected to the system bus 198. As illustrated in FIG. 12, these devices can include a memory system 200, one or more input devices 202, one or more output devices 204, one or more network interface devices 206, and one or more display controllers 208, as examples. The input device(s) 202 can include any type of input device, including but not limited to input keys, switches, voice processors, etc. The input device(s) 202 may be a peripheral coupled to the processor based system 190 through a USB connection. The output device(s) 204 can include any type of output device, including but not limited to audio, video, other visual indicators, etc. The output device(s) 204 may be a peripheral coupled to the processor-based system 190 through a USB connection. The network interface device(s) 206 can be any devices configured to allow exchange of data to and from a network 210. The network 210 can be any type of network, including but not limited to a wired or wireless network, private or public network, a local area network (LAN), a wide local area network, a wireless local area network, and the Internet. The network interface device(s) 216 can be configured to support any type of communication protocol desired.

The CPU(s) 192 may also be configured to access the display controller(s) 208 over the system bus 198 to control information sent to one or more displays 212. The display controller(s) 208 sends information to the display(s) 212 to be displayed via one or more video processors 214, which process the information to be displayed into a format suitable for the display(s) 212. The display(s) 212 can include any type of display, including but not limited to a cathode ray tube (CRT), light emitting diode (LED) display, a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of controlling data transfer through a universal serial bus (USB) connection, comprising:
    receiving, at a control system residing within the host coupled to the USB connection, a negative indication from at least one of a plurality of bulk endpoints indicating that the at least one of the plurality of bulk endpoints does not have data ready to transfer; and
    prioritizing, at the control system, bulk data transfers through the USB connection to other endpoints of the plurality of bulk endpoints based on the negative indication by skipping at least one polling of the at least one of the plurality of bulk endpoints associated with the negative indication.

2. The method of claim 1, wherein the negative indication comprises one of a negative acknowledgement (NAK), not ready (NRDY), or no response yet (NYET) signal.

3. The method of claim 1, wherein prioritizing the bulk data transfers comprises prioritizing the bulk data transfers for at least a frame in which the negative indication was received.

4. The method of claim 1, wherein prioritizing the bulk data transfers comprises prioritizing the bulk data transfers for a predefined time after the negative indication was received.

5. The method of claim 1, further comprising sending a query to each of the plurality of bulk endpoints requesting available data.

6. The method of claim 5, wherein sending the query comprises issuing an IN token.

7. The method of claim 5, further comprising receiving data from a second one of the plurality of bulk endpoints.

8. The method of claim 7, wherein prioritizing the bulk data transfers comprises preferentially receiving the data from the second one of the plurality of bulk endpoints.

9. The method of claim 1, wherein prioritizing the bulk data transfers over the USB connection to the other endpoints comprises using an adaptive learning algorithm to prioritize the bulk data transfers to endpoints having data to transfer.

10. The method of claim 1, wherein receiving the negative indication from the at least one of the plurality of bulk endpoints, indicating that the at least one of the plurality of bulk endpoints does not have data ready to transfer, comprises initially receiving the negative indication at an external controller and passing the negative indication to the control system.

11. A computing device comprising: a host configured to be coupled to a universal serial bus (USB) connection; wherein the host comprises a control system coupled with the USB connection, the control system configured to: receive a negative indication from at least one of a plurality of bulk endpoints indicating that the at least one of the plurality of bulk endpoints does not have data ready to transfer; and prioritize bulk data transfers through the USB connection to other endpoints of the plurality of bulk endpoints based on the negative indication by skipping polling of the at least one of the plurality of bulk endpoints associated with the negative indication.

12. The computing device of claim 11, wherein the negative indication comprises a negative acknowledgement (NAK) signal.

13. The computing device of claim 11, wherein the control system is further configured to send a query to each of the plurality of bulk endpoints requesting available data.

14. The computing device of claim 11, wherein the control system is external to the host.

15. The computing device of claim 11, wherein the control system is incorporated into the host.

16. The computing device of claim 11, wherein the control system is configured to enter a low power mode if none of the plurality of bulk endpoints have data to transfer.

17. The computing device of claim 11, wherein the host and the control system are integrated into an integrated circuit (IC).

18. The computing device of claim 11 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

19. The computing device of claim 11 further comprising an external scheduler associated with the control system, wherein the external controller is configured to receive the negative indication and pass information to the control system.

20. A method of controlling data transfer through a universal serial bus (USB) connection, comprising:
    determining that each of a plurality of bulk endpoints does not have data to transfer to a host, and skipping at least one polling of the at least one of the plurality of bulk end points that does not have data to transfer;
    determining that a pending frame includes one or more interrupt transfers; and sending an interrupt query to an interrupt endpoint before the pending frame begins.

21. The method of claim 20, further comprising starting the pending frame without any interrupt queries.

22. The method of claim 20, further comprising entering a low power mode if no interrupt data is received in response to the interrupt query.

23. The method of claim 20, further comprising prioritizing bulk data transfers if any of the plurality of bulk endpoints have data to transfer to the host.

24. A computing device comprising:
- a host configured to be coupled to a universal serial bus (USB) connection;
- said host further comprising a control system coupled to the USB connection, wherein the control system configured to:
- determine that each of a plurality of bulk endpoints does not have data to transfer to the host; determine that a pending frame includes one or more interrupt transfers, and skipping at least one polling of the at least one of the plurality of bulk end points that does not have data to transfer; and send an interrupt query to an interrupt endpoint through the USB connection before the pending frame begins.

* * * * *